(12) United States Patent
Oh et al.

(10) Patent No.: US 11,639,074 B2
(45) Date of Patent: May 2, 2023

(54) RIM COVER ASSEMBLY HAVING WATERPROOF STRUCTURE AND IN-WHEEL MOTOR HAVING THE SAME

(71) Applicant: LG ELECTRONICS INC., Seoul (KR)

(72) Inventors: Seung-Suk Oh, Seoul (KR); Jaekwang Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 16/856,895

(22) Filed: Apr. 23, 2020

(65) Prior Publication Data
US 2020/0346488 A1    Nov. 5, 2020

(30) Foreign Application Priority Data
Apr. 30, 2019    (KR) .................... 10-2019-0050813

(51) Int. Cl.
| | | |
|---|---|---|
| *B60B 7/00* | (2006.01) | |
| *B60B 7/01* | (2006.01) | |
| *B60B 7/14* | (2006.01) | |
| *B60K 7/00* | (2006.01) | |

(52) U.S. Cl.
CPC ................. *B60B 7/01* (2013.01); *B60B 7/14* (2013.01); *B60K 7/0007* (2013.01); *B60B 2900/211* (2013.01)

(58) Field of Classification Search
CPC ........... B60B 7/01; B60B 7/14; B60B 7/0007; B60B 2900/211
See application file for complete search history.

(56) References Cited

U.S. PATENT DOCUMENTS

| | | | | |
|---|---|---|---|---|
| 2,581,551 | A  * | 1/1952 | Myrmirides | ......... B60K 17/145 |
| | | | | 310/67 R |
| 2,949,040 | A  * | 8/1960 | Bixby | .................. B60K 17/043 |
| | | | | 74/390 |
| 8,316,973 | B2 * | 11/2012 | Walker | ................. B60K 7/0007 |
| | | | | 180/65.51 |

(Continued)

FOREIGN PATENT DOCUMENTS

| | | |
|---|---|---|
| CN | 103068591 A | 4/2013 |
| CN | 103874871 A | 6/2014 |

(Continued)

*Primary Examiner* — Hau V Phan
(74) *Attorney, Agent, or Firm* — Dentons US LLP

(57) ABSTRACT

A rim cover assembly having a waterproof structure according to an embodiment of the present invention includes a rim of which an outer wheel is surrounded by a tire, wherein a shaft passes through and is connected to a center of the rim, a cover coupled to the rim to seal an interior of the rim, tire separation prevention steps formed on the rim and the cover to prevent separation of the tire, and a bolt coupling portion which couples the cover and the rim, wherein the tire separation prevention steps include a first tire separation prevention step, which is integrally formed with the rim and protrudes from one side of the rim and a second tire separation prevention step integrally formed with the cover coupled to the other side of the rim, and the bolt coupling portion may be formed in the second tire separation prevention step.

5 Claims, 7 Drawing Sheets

(56) References Cited

U.S. PATENT DOCUMENTS

| | | | | |
|---|---|---|---|---|
| 8,925,662 | B2* | 1/2015 | Han | H02K 7/14 |
| | | | | 180/65.6 |
| 9,387,758 | B2* | 7/2016 | Heinen | B60L 50/51 |
| 2003/0038527 | A1 | 2/2003 | Tashiro et al. | |
| 2003/0217878 | A1* | 11/2003 | Etzioni | B62M 6/65 |
| | | | | 180/65.51 |
| 2011/0139523 | A1* | 6/2011 | Chen | B60K 7/0007 |
| | | | | 310/67 R |
| 2013/0009450 | A1* | 1/2013 | Suzuki | H02K 7/116 |
| | | | | 301/6.5 |
| 2014/0028081 | A1* | 1/2014 | Han | B60K 7/0007 |
| | | | | 301/6.5 |
| 2016/0121709 | A1* | 5/2016 | Shin | B60T 11/10 |
| | | | | 301/6.5 |

FOREIGN PATENT DOCUMENTS

| | | |
|---|---|---|
| JP | 2013-072458 A | 4/2013 |
| KR | 10-2013-0033087 A | 4/2013 |
| KR | 10-2014-0117507 A | 10/2014 |
| KR | 1020140117507 A | 10/2014 |
| KR | 10-2015-0055941 A | 5/2015 |
| KR | 10-1517075 B1 | 5/2015 |

\* cited by examiner

RIM COVER ASSEMBLY HAVING WATERPROOF STRUCTURE AND IN-WHEEL MOTOR HAVING THE SAME

CROSS-REFERENCE TO RELATED APPLICATION

This application claims priority to and the benefit of Korean Patent Application No. 10-2019-0050813, filed on Apr. 30, 2019, the disclosure of which is incorporated herein by reference in its entirety.

BACKGROUND

1. Field of the Invention

The present invention relates to a rim cover assembly having a waterproof structure and an in-wheel motor including the same.

2. Discussion of Related Art

In-wheel motors are used in mobile apparatuses that use electricity as a power source. Specifically, the in-wheel motors positioned in rims output power and directly transmit the power to wheels to rotate the wheels. Since the in-wheel motors do not need complex driving devices or power transmission devices, the in-wheel motors have relatively simple structures. Accordingly, the in-wheel motors have advantages in that the mobile apparatuses can be light and energy consumption can be reduced during power transmission.

General in-wheel motors include a tire, a rim, a stator, a rotor, and a shaft. The tire surrounds and is coupled to an outer wheel of the rim. The stator and the rotor are included in a motor assembly and provided inside the rim. The shaft passes through and is connected to a center of the stator. The stator receives external power, and a lead line for providing the power passes through a center of the shaft and is connected to the stator. When the power is supplied to the stator, the rotor rotates. The rim is connected to the rotor and is rotated together with the rotor. Accordingly, the tire coupled to an outer wheel of the rim is rotated.

Meanwhile, since the motor assembly including the rotor which rotates due to electricity and the stator are positioned inside the rim, the in-wheel motor needs to have a waterproof structure. However, since the in-wheel motor is used in a wheel of the mobile apparatus, a diameter of the in-wheel motor becomes an important issue. Accordingly, when the waterproof structure is used in the in-wheel motor, since additional space is needed, the in-wheel motor has a disadvantage of increasing a diameter. Accordingly, a technical solution for waterproof design without changing the diameter of the in-wheel motor is required.

As a related art of the present invention, an in-wheel motor for a vehicle is disclosed in Korean Patent Publication No. 10-2013-0033087 (published on Apr. 3, 2013, and hereinafter referred to as Related Document 1). In the disclosed in-wheel motor for a vehicle, a grommet which surrounds a connecting portion of a cable and the in-wheel motor and a cover passing through the grommet and the cable are used to secure a waterproof structure for the cable. However, there is an inevitable problem of increasing a size of the in-wheel motor when the grommet is used.

In addition, as another related art of the present invention, a tire wheel and an in-wheel motor wheel are disclosed in Korean Patent Publication No. 10-2014-0117507 (published on Oct. 7, 2014, and hereinafter referred to as Related Document 2). The disclosed in-wheel motor wheel includes a tire wheel, and a tire quick change ring is used to separate or install a tire. However, only a structure in which a rim is separated is disclosed, but a waterproof structure using a rim coupling structure is not disclosed and proposed.

SUMMARY OF THE INVENTION

The present invention is directed to a rim cover assembly of an in-wheel motor, the rim cover assembly allowing a waterproof structure to be secured without changing a diameter because the diameter is an important issue of the in-wheel motor used in a wheel of a mobile apparatus.

The present invention is directed to a rim cover assembly of an in-wheel motor, the rim cover assembly allowing a waterproof structure to be secured without increasing a diameter of an in-wheel motor by forming a tire separation prevention step on a cover coupled to a side surface of a rim and forming a coupling portion on the tire separation prevention step of the cover.

The present invention is directed to a rim cover assembly of an in-wheel motor, the rim cover assembly allowing convenience to be improved in tire replacing work by forming a tire separation prevention step on a cover coupled to a side surface of a rim to allow a tire to be replaced by only separating the cover.

The present invention is directed to an in-wheel motor which may be manufactured to have a compact size and an improved waterproof function and convenience in use by using a rim cover assembly having a waterproof structure.

Objectives of the present invention are not limited to the above described objectives, and other objectives which are not described above and advantages of the present invention may be more clearly understood through the following descriptions and clearly understood through embodiments of the present invention. In addition, it may be easily seen that the objectives and the advantages of the present invention may be easily realized using means and combinations thereof described in the appended claims.

According to an aspect of the present invention, there is provided a rim cover assembly of an in-wheel motor having a waterproof structure, which allows a waterproof structure to be secured without greatly changing a diameter of an in-wheel motor used in a wheel of a mobile apparatus.

A rim cover assembly according to one embodiment of the present invention includes a rim, a cover, tire separation prevention steps, and a bolt coupling portion.

A tire may surround and be coupled to an outer wheel of the rim, and a shaft may pass through and be connected to a center of the rim.

The cover may be coupled to the rim to seal an interior of the rim.

The tire separation prevention steps may be formed on the rim and the cover to prevent separation of the tire.

The bolt coupling portion, which is for coupling the cover and the rim, may be screw-coupled using a coupling bolt to maintain a tight coupling state between the cover and the rim so as to seal an inner space of the rim from the outside so that a waterproof structure may be secured.

The tire separation prevention steps may include a first tire separation prevention step, which is integrally formed with the rim and protrudes from one side of the rim, and a second tire separation prevention step integrally formed with the cover coupled to the other side of the rim.

In this case, the bolt coupling portion may be formed in the second tire separation prevention step. Accordingly, since an additional space for the bolt coupling portion is not required, the bolt coupling portion may be formed using the second tire separation prevention step formed on the cover even without increasing a diameter of the in-wheel motor.

The cover may include a cover body having a circular shape corresponding to the other side of the rim, and an edge protrusion which protrudes from an edge of the cover body toward the rim and is pressed against and coupled to a rim step.

In this case, the second tire separation prevention step may be formed on a protruding front of the edge protrusion to intersect a protruding direction of the edge protrusion.

The second tire separation prevention step may have the same size and shape as the first tire separation prevention step.

The bolt coupling portion may include a first bolt coupling portion and a second bolt coupling portion.

The first bolt coupling portion may be formed inside the edge protrusion in a direction in which the edge protrusion protrudes.

The second bolt coupling portion may be formed to face a front of the first bolt coupling portion and to extend from the other side of the rim to be parallel to the first bolt coupling portion.

Accordingly, the first bolt coupling portion and the second bolt coupling portion may be sequentially coupled using the coupling bolt.

As a specific example, the coupling bolt may include a bolt head, a first bolt body protruding from a center of the bolt head, and a second bolt body extending and protruding from the first bolt body.

In this case, when the coupling bolt is completely coupled, the bolt head may be inserted into an inclined hole positioned to a rear of the first bolt coupling portion.

In addition, the first bolt body may pass through and be coupled to a screw hole of the first bolt coupling portion.

In addition, the second bolt body may be inserted into and coupled to the second bolt coupling portion.

The second bolt coupling portion may have a diameter less than a diameter of the screw hole of the first bolt coupling portion. In addition, the second bolt coupling portion may have a length less than a depth of the screw hole of the first bolt coupling portion.

Meanwhile, a front end portion of the edge protrusion may be pressed against a wall surface of the rim step. In addition, an inner circumferential portion of the edge protrusion may be pressed against an outer circumferential portion of the rim step.

In this case, at least one O-ring may be provided between the inner circumferential portion of the edge protrusion and the outer circumferential portion of the rim step. Accordingly, there may be an effect in that the waterproof structure is reinforced.

An O-ring accommodation portion having a groove shape and a size sufficient for accommodating the O-ring may be further provided in the outer circumferential portion of the rim step.

The O-ring accommodation portion may be a rectangular groove having a vertical height greater than a lateral length thereof.

The O-ring accommodation portion may be formed to have the vertical height less than a diameter of an initial shape of the O-ring before the cover and the rim are assembled.

The O-ring accommodation portion may be formed to have the lateral length greater than the diameter of the initial shape of the O-ring before the cover and the rim are assembled.

Accordingly, before the cover and the rim are assembled, an upper end portion of the O-ring disposed in the O-ring accommodation portion may protrude from the O-ring accommodation portion. However, after the cover and the rim are assembled, the upper end portion of the O-ring may be vertically pressed by the edge protrusion, and the O-ring may be deformed in a shape having a distorted oval cross section to improve sealability so that a waterproof function may be improved.

A bent groove may be formed in an edge of the front end portion of the edge protrusion.

An outer protrusion having a shape corresponding to the bent groove to be pressed against the bent groove may be formed on an edge of the wall surface of the rim step.

Since a boundary at which the bent groove is pressed against the outer protrusion may be formed to be bent in a right angle shape, a flow path through which external water is introduced into the interior may be complexly formed so that the waterproof function may be improved.

According to another aspect of the present invention, there is provided an in-wheel motor including a rim cover assembly having a waterproof structure, the in-wheel motor capable of securing a waterproof structure without greatly changing a diameter of the in-wheel motor.

An in-wheel motor according to another embodiment of the present invention includes a rim, a motor assembly, a cover, tire separation prevention steps, and a bolt coupling portion.

A tire may surround and be coupled to an outer wheel of the rim, and a shaft may pass through and be connected to a center of the rim.

The motor assembly includes a stator and a rotor. The stator may be connected to the shaft inside the rim. The rotor may be formed to surround the stator and rotate.

The cover may be coupled to the rim to seal an interior of the rim.

The tire separation prevention steps may be formed on the rim and the cover to prevent separation of the tire.

The bolt coupling portion, which is for coupling the cover and the rim, may be screw-coupled using a coupling bolt to maintain a tight coupling state between the cover and the rim so as to seal an inner space of the rim from the outside so that a waterproof structure may be secured.

The tire separation prevention steps may include a first tire separation prevention step, which is integrally formed with the rim and protrudes from one side of the rim, and a second tire separation prevention step integrally formed with the cover coupled to the other side of the rim. In this case, the bolt coupling portion may be formed in the second tire separation prevention step.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
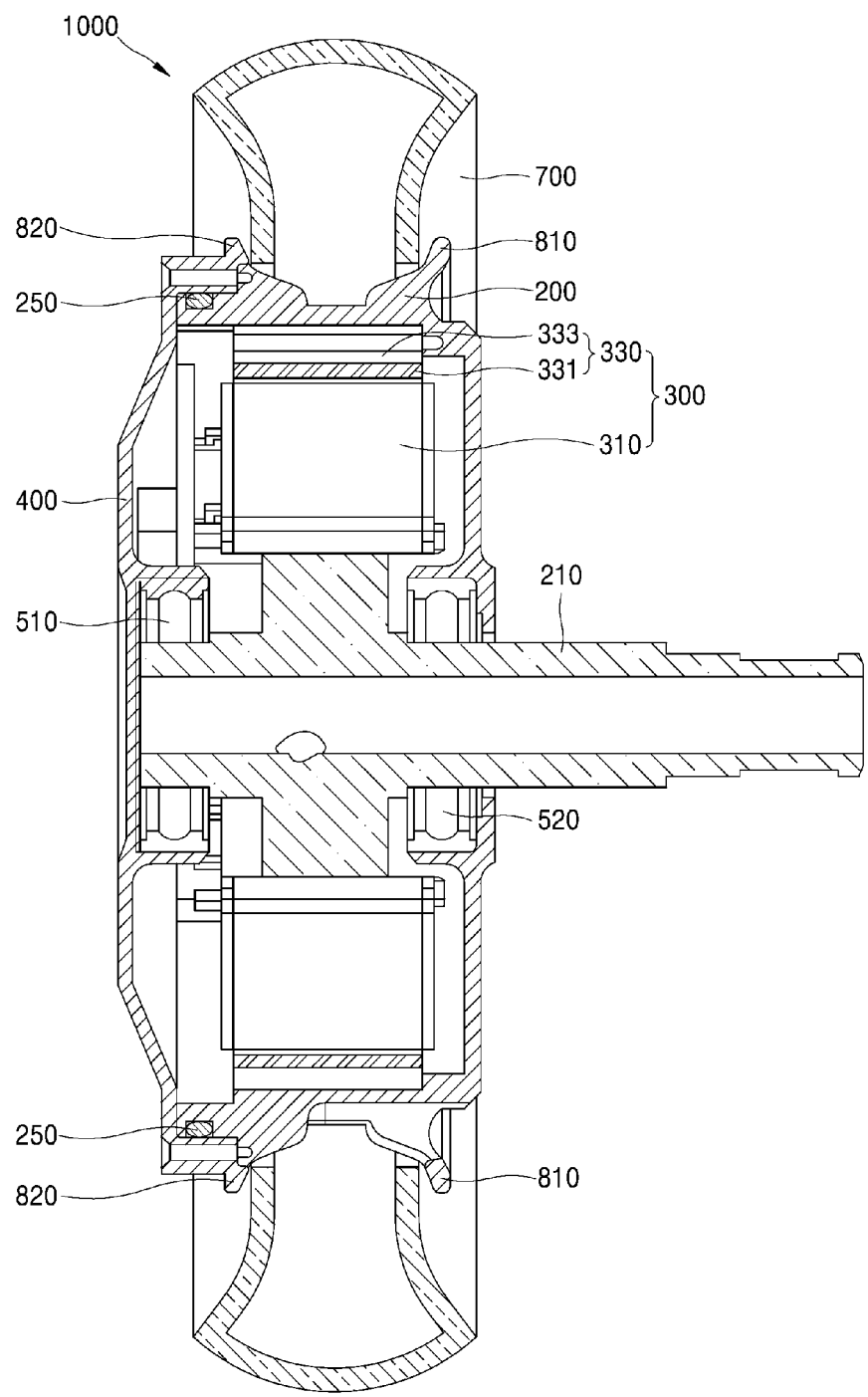
FIG. 1 is a schematic cross-sectional view illustrating an in-wheel motor including a rim cover assembly according to one embodiment of the present invention.

Hereinafter, embodiments of the present invention will be described in detail with reference to the accompanying drawings in order for those skilled in the art to easily perform the present invention. The present invention may be implemented in several different forms and is not limited to the embodiments described herein.

Parts irrelevant to the description will be omitted in order to clearly describe the present invention, and the same or similar parts are denoted by the same reference numerals throughout this specification. In addition, some embodiments of the present invention will be described in detail with reference to exemplary drawings. When the reference numerals are assigned to elements of each drawing, and the same elements are illustrated in different drawings, the same reference numerals may be assigned to the same elements if possible. Also, in the descriptions of the present invention, when detailed descriptions of related known configurations or functions are deemed to unnecessarily obscure the gist of the present invention, they will be omitted.

It should be understood that, when an element is referred to as being "connected or coupled" to another element, the element may be directly connected or coupled to another element, still another element may be interposed therebetween, or the elements may be connected or coupled through still another element.

In-Wheel Motor Having Waterproof Structure

Figure 2:
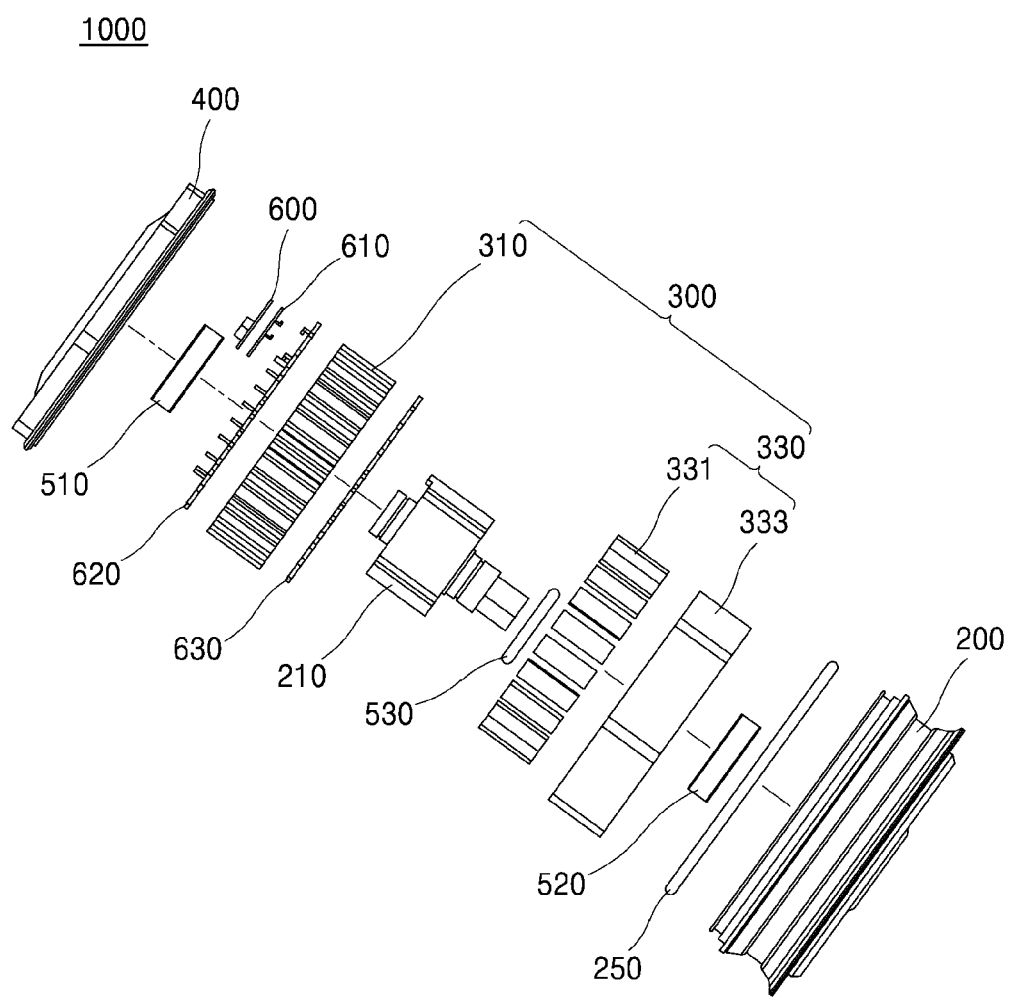
FIG. 2 is a schematic exploded perspective view illustrating the in-wheel motor including the rim cover assembly according to one embodiment of the present invention.

FIG. 1 is a schematic cross-sectional view illustrating an in-wheel motor including a rim cover assembly according to one embodiment of the present invention, and FIG. 2 is a schematic exploded perspective view illustrating the in-wheel motor including the rim cover assembly according to one embodiment of the present invention.

As illustrated in the drawings, an in-wheel motor 1000 includes a rim 200, a motor assembly 300, a cover 400, tire separation prevention steps 810 and 820, bolt coupling portions 420 and 220 (see FIG. 3), a Hall sensor substrate 600, bearings 510 and 520, and O-rings 530 and 250.

The rim 200 is a circular rigid member forming a wheel.

A hollow having a predetermined size is provided inside the rim 200. A shaft 210 and the motor assembly 300 are provided in the hollow of the rim 200.

Specifically, the rim 200, the shaft 210, and the motor assembly 300 are disposed to be coaxial and coupled to each other.

In addition, a tire 700 surrounds and is coupled to an outer side of an edge of the rim 200.

The motor assembly 300 is coupled to an inner side of the rim 200.

Specifically, the motor assembly 300 is disposed between and coupled to the shaft 210 and the rim 200.

The motor assembly 300 includes a stator 310 and a rotor 330.

The stator 310 is disposed inside the rim 200 to surround the shaft 210 in a circumferential direction and is connected to the shaft 210. For example, a hub is provided inside the stator 310, and the shaft 210 passes through and is coupled to a center of the hub.

The rotor 330 is disposed to surround the stator 310.

Specifically, the rotor 330 is disposed to be spaced apart from a circumferential surface of the stator 310 to have a gap. Accordingly, when power is applied to the stator 310 and an electromagnetic force is generated, the rotor 330 rotates about the stator 310.

The rotor 330 includes a magnet part 331 and a core part 333.

In this case, the magnet part 331 is a magnet (that is, a permanent magnet).

In addition, the core part 333 is a member which fixedly surrounds the magnet part 331, that is, a body of the rotor 330.

The core part 333 may be disposed to surround the magnet part 331.

Power is supplied to the stator through a lead line. The lead line may pass through the center of the shaft 210 and may be electrically connected to the stator 310.

Accordingly, the stator 310 is fixedly connected to the shaft 210 and is not rotated, and only the rotor 330 is rotated.

Accordingly, the rim 200 and the tire 700 are rotated about the shaft 210 together with the rotor 330.

The cover 400 is coupled to the rim 200 to seal an inner space of the rim 200.

Specifically, the cover 400 is coupled to the rim 200 to be positioned outside the tire 700 and to cover an open surface of the rim 200. Accordingly, various components in the in-wheel motor 1000 including the shaft 210 and the motor assembly 300 can be shielded from the outside and a waterproof structure can be secured.

The tire separation prevention steps 810 and 820 prevent separation of the tire 700 (see FIG. 1) installed on the in-wheel motor 1000.

The tire separation prevention steps 810 and 820 are formed on the rim 200 and the cover 400, respectively.

Specifically, tire separation prevention steps 810 and 820 include a first tire separation prevention step 810 provided on the rim 200 and a second tire separation prevention step 820 provided on the cover 400.

The first tire separation prevention step 810 is integrally formed with the rim 200 and protrudes from one side of the rim 200.

The second tire separation prevention step 820 is integrally formed with the cover 400 coupled to the other side of the rim 200.

In this case, one side of the rim 200 is an inside of the tire 700, and the other side of the rim 200 is an outside of the tire 700 coupled to the cover 400.

The bolt coupling portions 420 and 220 (see FIG. 3) allow the waterproof structure of the in-wheel motor 1000 in which the cover 400 is coupled to the rim 200 to be secured.

The bolt coupling portions 420 and 220 (see FIG. 3) are portions to which a coupling bolt 480 (see FIG. 6) is coupled.

The bolt coupling portions 420 and 220 tightly couple the cover 400 and the rim 200 to prevent external water or moisture from penetrating into the inner space of the rim 200.

The Hall sensor substrate 600 includes a Hall sensor configured to detect a magnetic force in the motor assembly 300 included in the in-wheel motor 1000.

Accordingly, the Hall sensor substrate 600 may be positioned close to the motor assembly 300.

For example, the Hall sensor substrate 600 may include at least one Hall sensor and may include two Hall sensors.

The plurality of bearings 510 and 520 may be provided.

One bearing 510 may be disposed at a front end portion of the shaft 210 and is referred to as a first bearing 510.

Another bearing 520 may be disposed at a rear end portion of the shaft 210 and is referred as a second bearing 520.

Specifically, the first bearing 510 is restrictedly disposed between the cover 400 and the front end portion of the shaft 210. Due to the first bearing 510, contact friction at the front end portion of the shaft 210 is reduced to help the tire 700 to rotate smoothly.

Specifically, the second bearing 520 is restrictedly disposed between a rear end 230 of the rim 200 and the rear end portion of the shaft 210. Due to the second bearing 520, contact friction at the rear end portion of the shaft 210 is reduced to help the tire 700 to rotate smoothly.

The shaft O-ring 530 is disposed at the rear end portion of the shaft 210 to seal an interior of the in-wheel motor 1000 from the outside.

Figure 6:
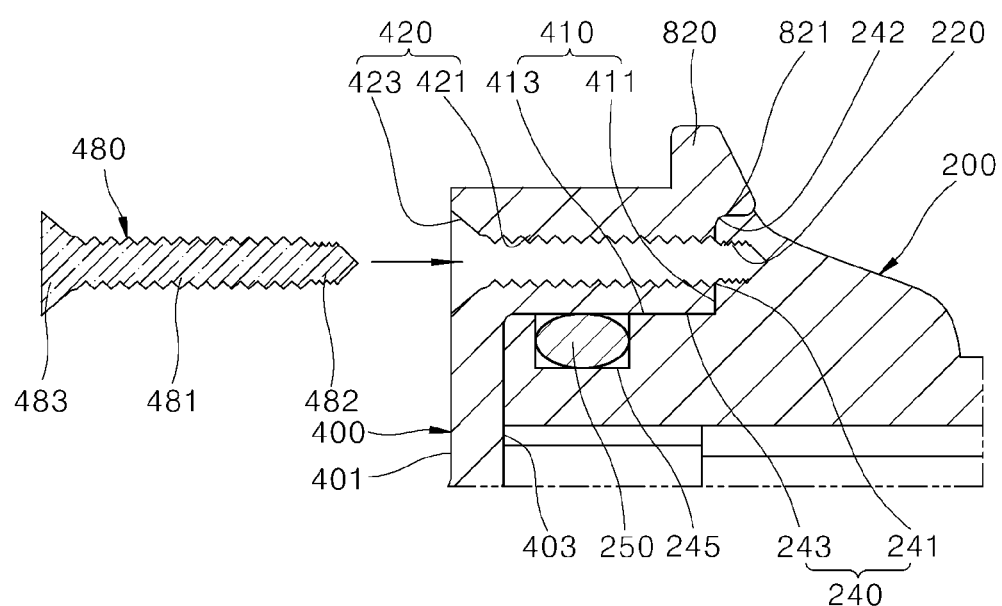
FIG. 6 is an enlarged cross-sectional view illustrating a process in which a coupling bolt is coupled to the rim cover assembly of the in-wheel motor according to one embodiment of the present invention.

In addition, the O-ring 250 provided to secure the waterproof structure by sealing the inner space of the rim 200 from the outside may be disposed close to a coupling portion of the cover 400 and the rim 200, that is, close to the bolt coupling portions 420 and 220 (see FIG. 6).

Meanwhile, referring to FIG. 2, the in-wheel motor 1000 may further include an insulator 610 for a Hall sensor substrate which is coupled to the Hall sensor substrate 600.

In addition, the in-wheel motor 1000 may further include a plurality of insulators 620 and 630 coupled to the front and rear of the motor assembly 300.

Rim Cover Assembly Having Waterproof Structure

Figure 3:
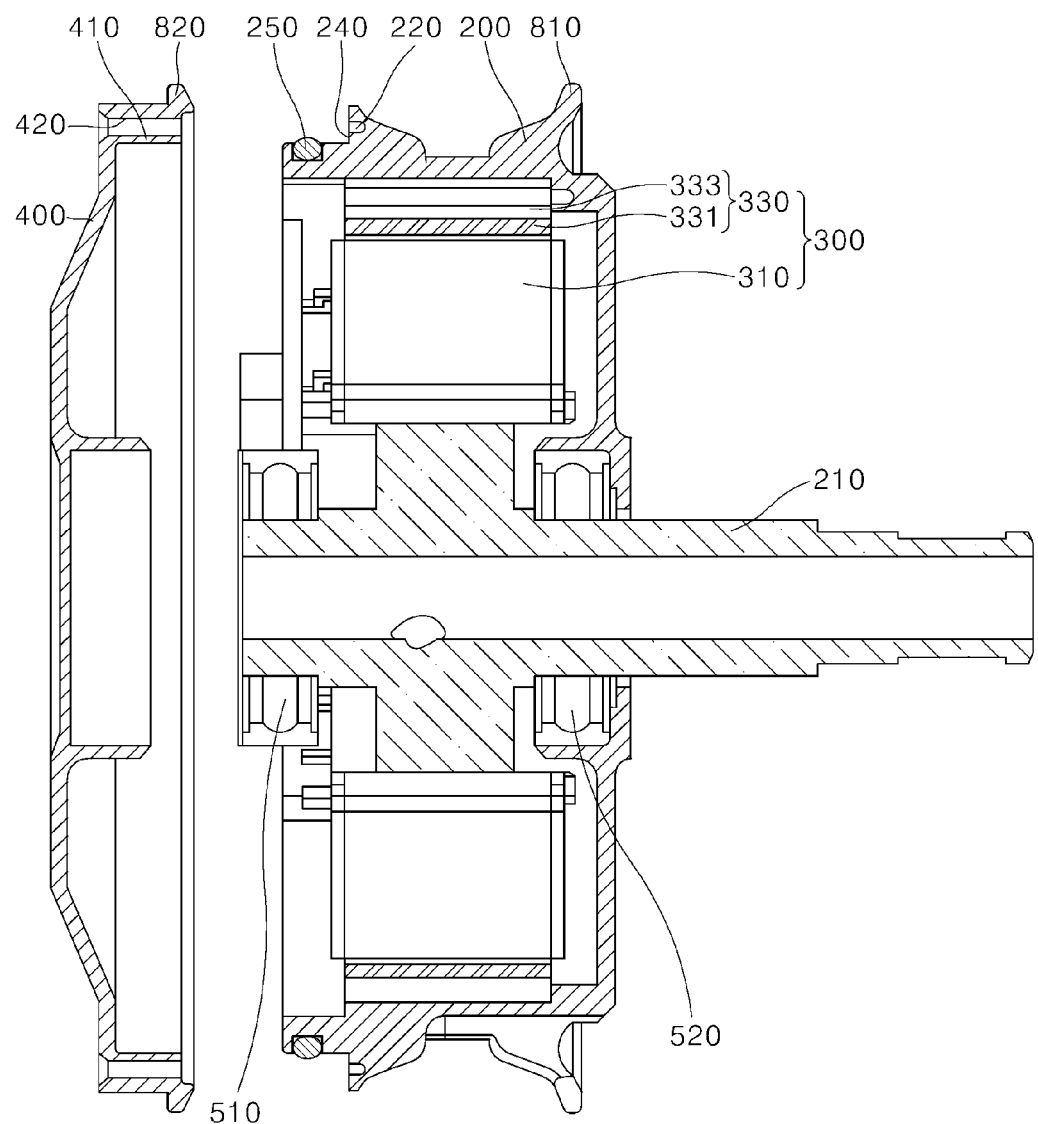
FIG. 3 is a cross-sectional view illustrating an in-wheel motor according to one embodiment of the present invention when a rim is separated from a cover.
Figure 4:
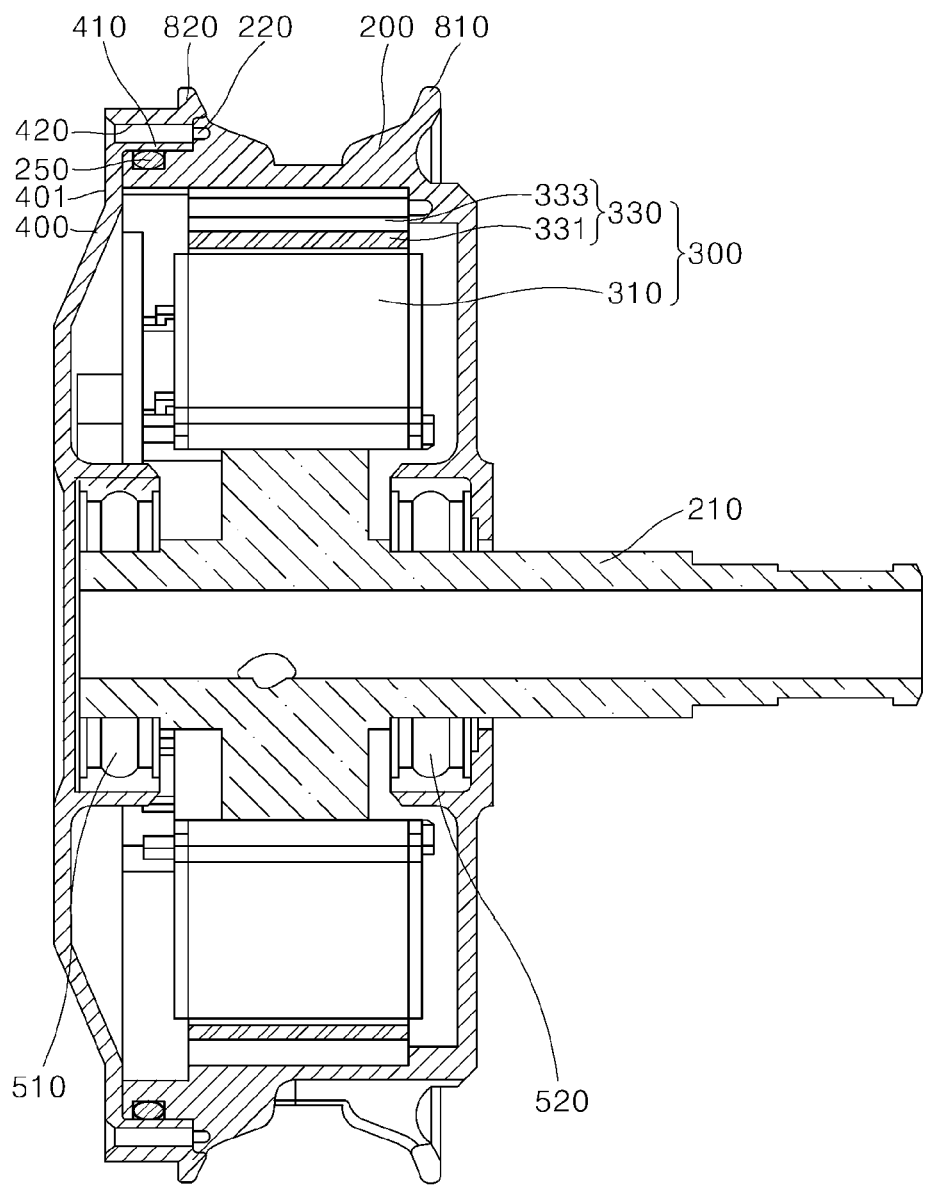
FIG. 4 is a cross-sectional view illustrating the in-wheel motor according to one embodiment of the present invention when the rim is coupled to the cover.
Figure 5:
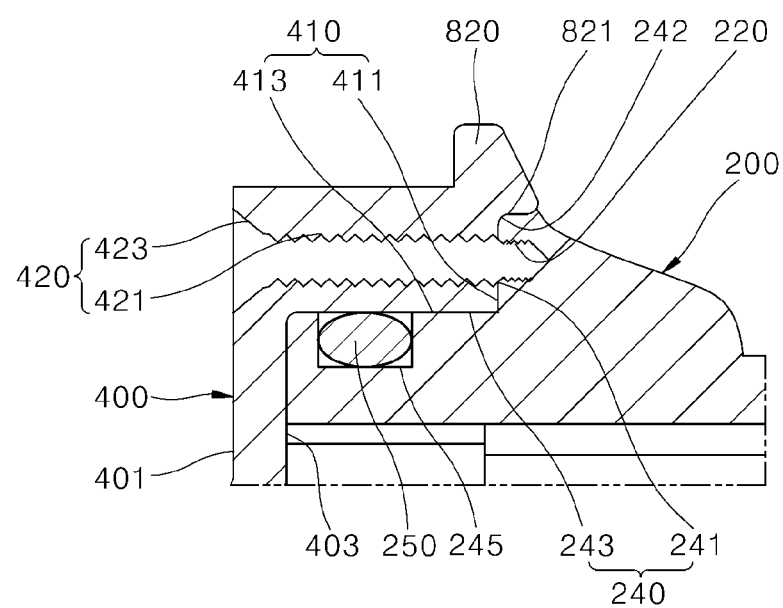
FIG. 5 is an enlarged cross-sectional view illustrating a region in which the rim is coupled to the cover in the in-wheel motor according to one embodiment of the present invention.

FIGS. 3 and 4 are cross-sectional views illustrating an in-wheel motor according to one embodiment of the present invention before and after a rim is coupled to a cover, and FIG. 5 is an enlarged cross-sectional view illustrating a portion in which the rim is coupled to the cover.

As illustrated in the drawings, a rim cover assembly having a waterproof structure includes a rim 200, a cover 400, tire separation prevention steps 810 and 820, bolt coupling portions 420 and 220 (see FIG. 3), and an O-ring 250.

The rim 200 is a circular rigid member, and a tire 700 (see FIG. 1) surrounds and is coupled to an outer wheel of the rim 200. In addition, an inner space having a predetermined size is provided inside the rim 200.

A plurality of components including a motor assembly 300 including a shaft 210, a stator 310, and a rotor 330 and first and second bearings 510 and 520 are embedded in the inner space of the rim 200.

Particularly, lines for supplying power to the stator 310 and a plurality of electrical and electronic components such as a Hall sensor substrate 600 (see FIG. 2) may be embedded in the inner space.

Accordingly, it is necessary for the inner space of the rim 200 to secure a waterproof structure.

Meanwhile, in the case of the rim cover assembly according to the embodiment of the present invention, the rim 200 does not have a structure, in which a plurality of divided bodies are manufactured and assembled to have an overall exterior, but has an integrated structure in which a single body forms an overall exterior.

Accordingly, structural rigidity of the rim 200 is improved, and thus, there are advantages in that stability and durability of the in-wheel motor 1000 are improved.

The cover 400 is coupled to the rim 200 to seal the inner space of the rim 200.

Specifically, the cover 400 is coupled to the rim 200 to be positioned outside the tire 700 and to seal an open side surface of the rim 200.

Accordingly, various inner components of the in-wheel motor 1000 including the shaft 210 and the motor assembly 300 can be shielded from the outside and the waterproof structure can be secured.

Specifically, the cover 400 includes a cover body 401 and an edge protrusion 410.

The cover body 401 is a circular member corresponding to the rim 200.

The edge protrusion 410 protrudes from an edge of the cover body 401 toward the rim 200 and is pressed against and coupled to a step of the rim 200 (hereinafter, referred to as a rim step 240 (see FIG. 5)).

The tire separation prevention steps 810 and 820 prevent separation of the tire 700 (see FIG. 1) installed on the in-wheel motor 1000.

The tire separation prevention steps 810 and 820 include a first tire separation prevention step 810 provided on the rim 200 and a second tire separation prevention step 820 provided on the cover 400.

The first tire separation prevention step 810 is integrally formed with the rim 200 and protrudes from one side of the rim 200. In addition, the second tire separation prevention step 820 is integrally formed with the cover 400 coupled to the other side of the rim 200.

Specifically, the first tire separation prevention step 810 protrudes to a predetermined height to have a shape in which an outer diameter increases at one side of the rim 200.

In addition, the second tire separation prevention step 820 is formed on the edge protrusion 410 of the cover 400 and protrudes in a direction which intersects a protruding direction of the edge protrusion 410 (see FIG. 3) and in which an outer diameter of the cover 400 increases.

As described above, although the first tire separation prevention step 810 is formed on the rim 200 and the second tire separation prevention step 820 is formed on the cover 400, sizes and shapes thereof may be formed to be the same.

The bolt coupling portions 420 and 220 are formed to couple the cover 400 and the rim 200.

The bolt coupling portions 420 and 220 are portions to which a coupling bolt 480 (see FIG. 6) is screw-coupled and tightly couple the cover 400 and the rim 200. Accordingly, external water or moisture can be prevented from penetrating into the inner space of the rim 200, and the waterproof structure can be secured.

FIG. 6 is a cross-sectional view illustrating the cover 400 and the rim 200 which are coupled to the coupling bolt 480 through the bolt coupling portions 420 and 220 in a state in which the cover 400 is pressed against the rim 200.

Referring to FIG. 6, the bolt coupling portions 420 and 220 may be formed using the second tire separation prevention step 820.

As a specific example, the bolt coupling portions 420 and 220 include a first bolt coupling portion 420 and a second bolt coupling portion 220.

The first bolt coupling portion 420 is formed inside the edge protrusion 410 in a direction in which the edge protrusion 410 protrudes.

The second bolt coupling portion 220 is formed inside the rim 200 to face the front of the first bolt coupling portion 420, is coaxial with the first bolt coupling portion 420, and is formed to extend parallel to a longitudinal direction of the first bolt coupling portion.

In this case, the first and second bolt coupling portions 420 and 220 have screw hole shapes and have sizes and the shapes through which the first and second bolt coupling portions 420 are screw-coupled to body portions of the coupling bolt 480.

Accordingly, the coupling bolt 480 is sequentially coupled to the first bolt coupling portion 420 and the second bolt coupling portion 220 to couple the cover 400 to the other side of the rim 200.

As described above, the bolt coupling portions 420 and 220, specifically, the first bolt coupling portion 420, may be formed using the second tire separation prevention step 820 according to the present invention.

As a result, in the case of the rim cover assembly according to the present invention, since an additional space for forming the bolt coupling portions to secure the waterproof structure is not needed, a diameter of the in-wheel motor may not be increased.

The coupling bolt 480 includes a bolt head 483, a first bolt body 481, and a second bolt body 482.

The first bolt body 481 protrudes to a predetermined length from a center of the bolt head 483 and may have a screw thread corresponding to the first bolt coupling portion 420.

The second bolt body 482 is a portion protruding to extend from a front end of the first bolt body 481 in a longitudinal direction of the coupling bolt 480 and may have a screw thread corresponding to the second bolt coupling portion 220.

Accordingly, when coupling of the coupling bolt 480 is completed, the bolt head 483 is inserted into an inclined hole 423 positioned to the rear of the first bolt coupling portion 420.

In addition, the first bolt body 481 passes through and is screw-coupled to a screw hole 421 of the first bolt coupling portion 420. In addition, the second bolt body 482 is inserted into and coupled to the second bolt coupling portion 220. Accordingly, the coupling bolt 480 may be coupled through the bolt coupling portions 420 and 220 provided using the second tire separation prevention step 820 without increasing a diameter of a motor and may also secure the waterproof structure.

Meanwhile, the second bolt coupling portion 220 may have a diameter which is less than a diameter of the screw hole 421 of the first bolt coupling portion 420. For example, the second bolt coupling portion 220 may have the diameter ranging from 0.5 to 0.9 times the diameter of the screw hole 421 of the first bolt coupling portion 420. Otherwise, there are disadvantages in that, in a case in which the diameter of the second bolt coupling portion 220 is less than 0.5 times the diameter of the screw hole 421, coupling strength may be low and it may be difficult to maintain a tight coupling state, and in a case in which the diameter of the second bolt coupling portion 220 is greater than 0.9 times the diameter of the screw hole 421, a large space should be secured at the other side of the rim 200.

In addition, the second bolt coupling portion 220 may have a length which is less than a depth of the screw hole 421 of the first bolt coupling portion 420. Accordingly, a length of the first bolt body 481 of the coupling bolt 480 may be greater than a length of the second bolt body 482.

Meanwhile, the edge protrusion 410 may be pressed against the rim step 240 without a gap therebetween to secure the waterproof structure using the coupling portions thereof.

Specifically, a front end portion 411 of the edge protrusion 410 is pressed against a wall surface 241 of the rim step 240.

In addition, an inner circumferential portion 413 of the edge protrusion 410 is pressed against an outer circumferential portion 243 of the rim step 240.

The state in which the edge protrusion 410 is pressed against the rim step 240 may be more tightly maintained due to the coupling of the coupling bolt 480, and a waterproof function may be improved.

Meanwhile, an O-ring 250 is provided between the inner circumferential portion 413 of the edge protrusion 410 and the outer circumferential portion 243 of the rim step 240.

The O-ring 250 may improve the waterproof function of a coupling portion of the cover 400 and the rim 200.

To this end, a groove, that is, an O-ring accommodation portion 245 having a size sufficient for accommodating the O-ring 250, may be provided in the outer circumferential portion 243 of the rim step 240.

The O-ring accommodation portion 245 may be a rectangular groove of which a lateral length is greater than a vertical height.

The vertical height of the O-ring accommodation portion 245 may be less than a diameter of an initial shape of the O-ring 250 (that is, a shape thereof in a state in which an external force is not applied to the O-ring 250).

In addition, the lateral length of the O-ring accommodation portion 245 may be greater than the diameter of the initial shape of the O-ring 250.

Accordingly, as illustrated in FIG. 3, before the cover 400 and the rim 200 are assembled, an upper end portion of the O-ring 250 disposed in the O-ring accommodation portion 245 may protrude to a predetermined height from an upper portion of the O-ring accommodation portion 245.

In addition, after the cover 400 and the rim 200 are assembled, the upper end portion of the O-ring 250 is vertically pressed due to the edge protrusion 410 and the rim step 240 which are pressed against each other.

Accordingly, as illustrated in FIG. 4, the O-ring 250 is deformed to have a distorted oval cross section of which a lateral width is greater than a vertical height, and the deformed O-ring 250 may improve the waterproof function between the edge protrusion 410 and the rim step 240.

Meanwhile, in order to reinforce the waterproof structure of the rim cover assembly, a bent groove 821 may be formed in an edge of the front end portion 411 of the edge protrusion 410.

In addition, an outer protrusion 242, which has a shape corresponding to the bent groove 821 and is pressed against the bent groove 821, may be formed on an edge of the wall surface 241 of the rim step 240.

Since a boundary in which the bent groove 821 is pressed against the outer protrusion 242 is formed to have a right angle shape, that is a bent "¬" shape, the boundary has a structure which is difficult to introduce external water or moisture into the inner space of the rim 200 when compared to a linear flow path. Accordingly, the waterproof function can be further improved.

Figure 7:
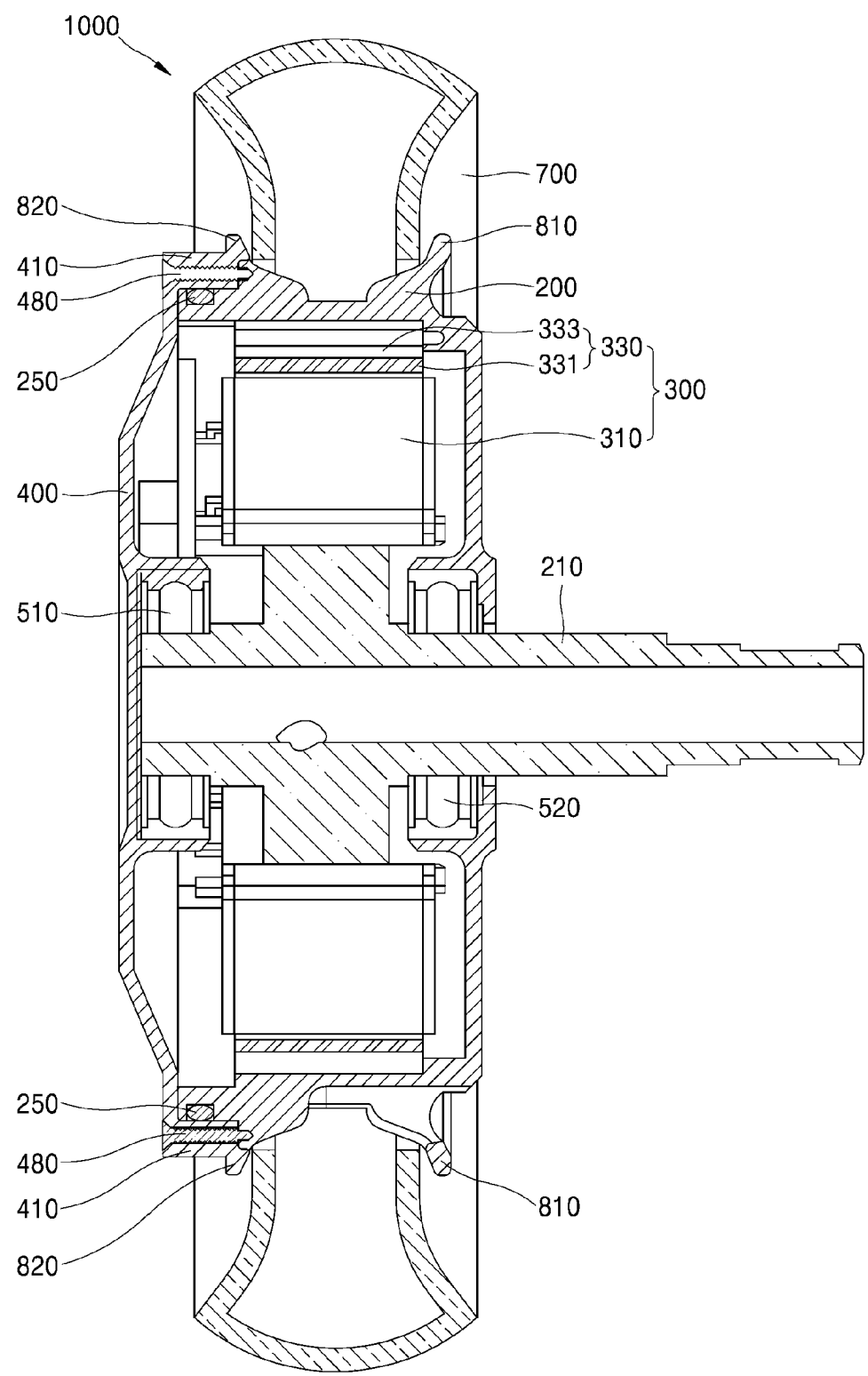
FIG. 7 is a schematic cross-sectional view illustrating the in-wheel motor including the rim cover assembly in which the rim is coupled to the cover by the coupling bolt illustrated in FIG. 6.

Referring to FIG. 7, the first tire separation prevention step 810 is formed to protrude from one side of the rim 200. In addition, the second tire separation prevention step 820 is formed to protrude from the cover 400 coupled to the other side of the rim 200.

The rim 200 does not have a structure having a plurality of divided bodies but has an integral structure which is structurally stable.

In addition, when the tire is separated and replaced, the cover 400 is separated from the rim 200 to outwardly separate the second tire separation prevention step 820 so that the tire can be easily separated.

Meanwhile, since the bolt coupling portions 420 and 220 (see FIG. 6) coupled to the coupling bolt 480 are formed in the second tire separation prevention step 820, the waterproof structure can be secured even without increasing an entire diameter of the in-wheel motor.

In addition, at least one O-ring 250 may be installed between the cover 400 and the rim 200 to improve the waterproof function.

As described above, in the rim cover assembly of an in-wheel motor and the in-wheel motor including the same according to the present invention, the waterproof structure can be secured without changing the diameter of the in-wheel motor used as a wheel of a mobile apparatus.

In the case of a conventional in-wheel motor, an additional space needs to be secured to couple a bolt so as to secure a waterproof structure, and thus a size of a diameter of the in-wheel motor should be increased.

However, since the diameter of the in-wheel motor mainly used in a portable mobile apparatus becomes an important issue, there is a problem in that the diameter should be greatly increased to secure the waterproof structure.

In addition, according to the present invention, the body of the rim cannot be divided, the tire separation prevention step can be formed on the cover coupled to the side surface of the rim, and the coupling portion coupled to the bolt can be formed in the tire separation prevention step of the cover.

Accordingly, there is an advantage in that the waterproof structure can be secured even without increasing the diameter of the in-wheel motor.

As a specific example, the body of the rim is not be divided into halves, the first tire separation prevention step can be formed at one side of the rim, and the second tire separation prevention step can be on the cover coupled to the other side of the rim.

In addition, the coupling portion coupled to the bolt and the O-ring can be installed at the second tire separation prevention step to secure the waterproof structure without changing the diameter of the in-wheel motor.

In addition, according to the present invention, by only separating the cover coupled to the other side of the rim, the second tire separation prevention step can be separated so that the tire can be simply replaced and installed and work convenience can be improved.

In addition, since the present invention has a structure in which the body of the rim is not divided into a plurality of pieces, structural strength can be improved when compared to a structure in which a body is divided into halves and coupled. Accordingly, there are advantages in that stability in use and durability of the in-wheel motor are improved.

Specific effects and the above-described effects of the present invention have been described while the specific embodiments for realizing the present invention are described in the detailed description.

Although the present invention has been described with reference to the accompanying drawings as described above, the present invention is not limited by the embodiments and drawings illustrated in the present specification, and it is clear that the present invention is variously modified by those skilled in the art within a range of the technical spirit of the present invention. In addition, while the embodiments of the present invention have been described, although the operational effects according to the structure of the present invention have not been clearly described, predictable effects according to the corresponding structure should also be recognized.

What is claimed is:

1. An in-wheel motor comprising:
a rim of which an outer wheel is surrounded by a tire, wherein a shaft passes through and is rotatably connected to a center of the rim,
a motor assembly including a stator, which is connected to the shaft inside the rim, and a rotor which surrounds the stator and is rotatable about the stator;
a cover coupled to the rim to seal an interior of the rim;
tire separation prevention steps formed on the rim and the cover to prevent a separation of the tire from the rim; and
a bolt coupling portion to couple the cover and the rim together,
wherein the tire separation prevention steps include a first tire separation prevention step, which is integrally formed with the rim and protrudes from one side of the rim and a second tire separation prevention step integrally formed with the cover that couples to an other side of the rim, and at least a portion of the bolt coupling portion is formed at the second tire separation prevention step,
wherein the cover includes:
a cover body having a circular shape corresponding to the other side of the rim; and
an edge protrusion which protrudes from an edge of the cover body towards the rim and is pressed against and coupled to a rim step of the rim,
wherein the bolt coupling portion includes:
a first bolt coupling portion formed inside the edge protrusion; and
a second bolt coupling portion formed to face a front of the first bolt coupling portion and formed inside the other side of the rim to be parallel to the first bolt coupling portion.

2. The in-wheel motor of claim 1, wherein the second tire separation prevention step is formed at a protruding front of the edge protrusion.

3. The in-wheel motor of claim 1, wherein:
the first bolt coupling portion and the second bolt coupling portion are coupled using a coupling bolt; and
the coupling bolt includes a bolt head, a first bolt body protruding from a center of the bolt head, and a second bolt body extending and protruding from the first bolt body.

4. The in-wheel motor of claim 1, wherein:
a front end portion of the edge protrusion is pressed against a wall surface of the rim step;
an inner circumferential portion of the edge protrusion is pressed against an outer circumferential portion of the rim step; and
at least one O-ring is disposed between the inner circumferential portion of the edge protrusion and the outer circumferential portion of the rim step.

5. The in-wheel motor of claim 4, wherein:
a bent groove is formed at an edge of the front end portion of the edge protrusion; and
an outer protrusion having a shape corresponding to the bent groove to be pressed against the bent groove is formed at an edge of the wall surface of the rim step.

* * * * *